(12) United States Patent
Holt et al.

(10) Patent No.: US 10,626,800 B2
(45) Date of Patent: Apr. 21, 2020

(54) SYSTEM AND METHOD FOR CALIBRATING A CASE COOLING SYSTEM FOR A GAS TURBINE ENGINE

(71) Applicant: ROLLS-ROYCE plc, London (GB)

(72) Inventors: Jonathan E Holt, Derby (GB); Leo V Lewis, Kenilworth (GB)

(73) Assignee: ROLLS-ROYCE plc, London (GB)

( * ) Notice: Subject to any disclaimer, the term of this patent is extended or adjusted under 35 U.S.C. 154(b) by 593 days.

(21) Appl. No.: 15/277,599

(22) Filed: Sep. 27, 2016

(65) Prior Publication Data

US 2017/0114725 A1 Apr. 27, 2017

(30) Foreign Application Priority Data

Oct. 21, 2015 (GB) .................................. 1518641.4

(51) Int. Cl.
*F01D 11/24* (2006.01)
*F02C 9/18* (2006.01)
(Continued)

(52) U.S. Cl.
CPC .................. *F02C 9/18* (2013.01); *F01D 5/02* (2013.01); *F01D 11/24* (2013.01); *F01D 21/003* (2013.01);
(Continued)

(58) Field of Classification Search
CPC ........... F01D 11/24; F01D 11/20; F01D 11/14
See application file for complete search history.

(56) References Cited

U.S. PATENT DOCUMENTS 3,596,518 A * 8/1971 Kirkpatrick ............ G01K 13/02
374/134
4,215,412 A * 7/1980 Bernier .................... G07C 3/00
701/100
(Continued)

FOREIGN PATENT DOCUMENTS

EP 1607584 A1 12/2005
EP 2025878 A2 2/2009
(Continued)

OTHER PUBLICATIONS

Mar. 22, 2016 European Search Report issued in cooresponding Patent Application No. GB1518641.4.
(Continued)

*Primary Examiner* — Kenneth J Hansen
*Assistant Examiner* — Andrew J Marien
(74) *Attorney, Agent, or Firm* — Oliff PLC

(57) ABSTRACT

A case cooling calibration system for a gas turbine engine includes a rotor casing, and a stage, rotatably mounted within the rotor casing. The rotor-casing includes in-series fluid communication, a duct, a flow control valve, and a manifold. The valve regulates an air flow through the duct to the manifold, which is arranged radially outwardly around the casing radially coplanar with the rotor stage. A temperature sensing apparatus is positioned on the rotor casing, radially outwardly of the rotor stage. A controller regulates the valve in a stepwise manner providing a variable cooling air-flow to the rotor-casing. A processor calculates a correction depending on a comparison between the rotor casing temperature and a predicted rotor-casing temperature for a given engine power condition. An engine controller controls the valve depending on the correction characteristic to maintain a predetermined operational radial clearance between the rotor-stage and the rotor-casing.

22 Claims, 5 Drawing Sheets

(51) Int. Cl.
*F01D 21/12* (2006.01)
*F01D 5/02* (2006.01)
*F01D 21/00* (2006.01)
*F01D 25/12* (2006.01)
*F01D 25/14* (2006.01)
*F01D 25/24* (2006.01)
*F02C 7/18* (2006.01)
*F01D 17/02* (2006.01)

(52) U.S. Cl.
CPC ............. *F01D 21/12* (2013.01); *F01D 25/12* (2013.01); *F01D 25/14* (2013.01); *F01D 25/24* (2013.01); *F02C 7/18* (2013.01); *F01D 17/02* (2013.01); *F05D 2220/32* (2013.01); *F05D 2260/20* (2013.01); *F05D 2270/112* (2013.01); *F05D 2270/303* (2013.01)

(56) References Cited

U.S. PATENT DOCUMENTS

| | | | | |
|---|---|---|---|---|
| 4,258,424 | A * | 3/1981 | Giras | F01D 17/04 60/660 |
| 6,185,944 | B1 * | 2/2001 | Gaul | F04B 39/066 62/115 |
| 6,487,491 | B1 * | 11/2002 | Karpman | F01D 11/24 415/115 |
| 6,626,635 | B1 * | 9/2003 | Prowse | F01D 11/18 415/1 |
| 7,708,518 | B2 * | 5/2010 | Chehab | F01D 11/24 415/1 |
| 8,315,741 | B2 * | 11/2012 | Karpman | F02C 9/28 415/115 |
| 9,494,490 | B2 * | 11/2016 | Tralshawala | F01D 17/04 |
| 2006/0086812 | A1 * | 4/2006 | Muller | B01F 5/0646 236/1 C |
| 2008/0247863 | A1 * | 10/2008 | Razzell | F01D 11/20 415/118 |
| 2009/0208321 | A1 * | 8/2009 | O'Leary | F01D 11/24 415/14 |
| 2011/0027068 | A1 * | 2/2011 | Floyd, II | F01D 11/24 415/13 |
| 2011/0229306 | A1 * | 9/2011 | Lewis | F01D 11/24 415/115 |
| 2011/0236179 | A1 * | 9/2011 | Rog | F01D 11/24 415/1 |
| 2011/0243708 | A1 * | 10/2011 | Hafner | F01D 11/20 415/1 |
| 2013/0152602 | A1 * | 6/2013 | Bacic | F02C 6/08 60/782 |
| 2013/0191004 | A1 * | 7/2013 | Beecroft | F01D 11/20 701/100 |
| 2015/0308282 | A1 * | 10/2015 | Bacic | F01D 11/24 415/116 |
| 2016/0326878 | A1 * | 11/2016 | Morimoto | F01D 5/081 |
| 2016/0326915 | A1 * | 11/2016 | Baladi | F01D 11/24 |

FOREIGN PATENT DOCUMENTS

EP 2375004 A2 10/2011
EP 2604825 A2 6/2013

OTHER PUBLICATIONS

Apr. 20, 2017 Search Report issued in European Patent Application No. 16190765.4.

* cited by examiner

SYSTEM AND METHOD FOR CALIBRATING A CASE COOLING SYSTEM FOR A GAS TURBINE ENGINE

This disclosure claims the benefit of UK Patent Application No. GB1518641.4, filed on 21 Oct. 2015, which is hereby incorporated herein in its entirety.

FIELD OF THE DISCLOSURE

The present disclosure relates to a method of calibrating a case cooling system and particularly, but not exclusively, to a method of calibrating a case cooling system for an aerospace gas turbine engine, together with a system for performing such a method.

BACKGROUND TO THE DISCLOSURE

It is well known that the turbine blade tip clearance, being the radial distance between the stationary engine casing and the tips of the rotating aerofoil turbine blades, has a significant effect on the efficiency of the turbine.

During operation of the gas turbine engine, the turbine blades are subjected to radially outwardly directed centrifugal forces resulting from the rotation of the turbine assembly.

These centrifugal forces, in combination with the high operating temperature and pressure of the gas passing through the engine result in significant changes in turbine blade tip clearance. The variation in engine operating conditions resulting from the different demands of a flight cycle can result in frequent variation in the turbine blade tip clearance.

It is well known that the efficiency of a gas turbine engine is inversely proportional to the turbine blade tip clearance. Large turbine blade tip clearances result in leakage of high pressure gas past the blade tip, which in turn causes a loss in engine efficiency. If, on the other hand, the turbine blade tip clearance is too small, then the turbine blades may rub against the internal surface of the casing causing damage to casing and/or turbine blades.

A conventional case cooling system for a gas turbine engine employs a cooling air flow directed through a manifold arrangement, with the air flow being regulated by one or more valves. Typically, such a system is configured using predicted nominal flow characteristics for the manifold(s) and valves(s).

There are two main sources of variability in such conventional case cooling systems. The first is the valve, which is the dominant source of flow variability at low cooling air flow rates. The second is the total hole area of the manifold impingement jets, which are the dominant source of flow variability at high cooling air flow rates.

Such a conventional case cooling system typically either equalises the tip clearances at the sea level high power and altitude high power conditions, or alternatively maintains the tip clearances at the sea level high power and altitude high power conditions in a known disposition relative to one another.

Consequently, any difference in the flow characteristics of the valve(s) and/or the manifold(s) will result in this tip clearance relationship deviating from that of the design and thus being detrimental to the performance of the case cooling system. For example, a low-flowing manifold in combination with a high-flowing valve can be detrimental to the altitude high power condition. Conversely, a high-flowing manifold in combination with a low-flowing valve can be detrimental to the sea level high power condition.

This variation in cooling flow characteristics and the consequent variation in tip clearance control, from engine to engine can be detrimental to the on-wing control of multiple engines.

There is therefore a requirement to calibrate the case cooling system so as to maintain the rotor blade tip clearance within a predetermined range, across the range of operation of the gas turbine engine, in order to reduce the variation in rotor blade tip clearance from engine to engine.

STATEMENTS OF DISCLOSURE

According to a first aspect of the present disclosure there is provided a method of calibrating a case cooling system for a gas turbine engine, the engine comprising a rotor stage, the rotor stage being rotatably mounted within a rotor casing, the rotor casing comprising in series fluid communication, a duct, a flow control valve, and a manifold, the valve being operable to regulate an air flow through the duct to the manifold, the manifold arranged radially outwardly around the casing radially coplanar with the rotor stage, the method comprising the steps of:
(i) positioning a temperature sensing apparatus on the rotor casing, radially outwardly of the rotor stage;
(ii) closing the valve to prevent air flow through the duct;
(iii) operating the engine at a fixed power setting for a first predetermined period of time;
(iv) sensing a temperature of the rotor casing with the temperature sensing apparatus;
(v) opening the valve to a next flow setting position;
(vi) repeating steps (iii) to (v) until the valve is fully open;
(vii) generating a first characteristic being representative of the variation of the rotor casing temperature with valve position for the engine operation at the fixed power setting;
(viii) determining an engine correction characteristic from a difference between the first characteristic and a second characteristic, the second characteristic being representative of a theoretical prediction of the variation of the rotor casing temperature with valve position for the engine; and
(ix) transmitting the engine correction characteristic to an engine control unit to calibrate the turbine case cooling system of the engine to enable a predetermined operational radial clearance to be maintained between the rotor stage and the rotor casing.

Conventional case cooling systems assume that all gas turbine engines of a given type will produce the same case cooling system flow for a given demanded flow. However, in practice there is a variation in case cooling system flow for any given cooling flow demand.

Furthermore, an individual engine's variation in case cooling system flow with demanded cooling flow can itself vary as the valve is opened from a minimum flow position to a maximum flow position.

The method of the disclosure enables the cooling flow characteristic provided by the engine's case cooling system to be matched to the thermal characteristics of the whole engine. This enables a predetermined operational radial clearance to be maintained between the rotor stage and the rotor casing across the operational range of the engine, which in turn minimises a variation in rotor blade tip clearance from engine to engine.

Optionally, the valve is operable to regulate an air flow through the duct to the manifold at N flow setting positions, and step (vi) comprises the step of:
(vi)' repeating steps (iii) to (v) N times.

Optionally, step (i) comprises the step of:
(i)' positioning a temperature sensing apparatus on a radially outwardly facing surface of the rotor casing, radially outwardly of, the rotor stage.

The temperature sensing apparatus is positioned at a location having a high sensitivity to the thermal effects of variation in case cooling flow rate.

This enables the method of the disclosure to provide an engine correction characteristic that provides for a predetermined operational radial clearance to be maintained between the rotor stage and the rotor casing across the operational range of the engine, which in turn minimises a variation in rotor blade tip clearance from engine to engine.

An advantage of this feature is that rubbing between the rotor stage and the casing can be prevented.

Optionally, the outwardly facing surface of the rotor casing is radially coplanar with the rotor stage.

By selecting the outwardly facing surface of the rotor casing to be radially coplanar with the rotor stage, the method of the disclosure can provide for maximum sensitivity to relative thermal growth of the rotor stage and the casing. This makes the method of the disclosure more effective at maintaining a predetermined operational radial clearance between the rotor stage and the rotor casing across the operational range of the engine, which in turn minimises a variation in rotor blade tip clearance from engine to engine.

Optionally, step (i) comprises the step of:
(i)' positioning one or more thermocouples at each of two or more circumferential locations on a radially outwardly facing surface of the rotor casing, radially outwardly of the rotor stage the temperature sensing apparatus.

The use of thermocouples for sensing the temperature of the rotor casing makes the method of the disclosure convenient for a user.

Optionally, step (i) comprises the step of:
(i)" positioning two thermocouples at each of two or more circumferential locations on a radially outwardly facing surface of the rotor casing, radially outwardly of the rotor stage the temperature sensing apparatus.

The use of two thermocouples at each of the circumferential locations enables an averaged temperature measurement to be made of the rotor casing temperature. This can provide a user with a more representative value of the temperature of the rotor casing.

In one arrangement, the two thermocouples are positioned at each of four circumferentially equally spaced locations on a radially outwardly facing surface of the rotor casing.

The use of two thermocouples at each of two or more circumferential locations provides the method of the disclosure with a degree of redundancy in the event of the failure of one of the thermocouples.

Optionally, step (iii) comprises the step of:
(iii)' operating the engine at a fixed power setting for a first predetermined period of time, the first predetermined period of time being between 3 minutes and 8 minutes.

Operating the engine at a fixed power setting ensures that the rotor stage and the rotor casing are in a thermal equilibrium. In this way, the temperature sensing apparatus can provide a user with a temperature that is representative of the rotor casing temperature for the given power setting.

This in turn enables the cooling flow at this engine power setting to be arranged so as to provide the required predetermined radial clearance between the rotor stage and the rotor casing.

Optionally, step (iii)' comprises the step of:
(iii)' operating the engine at a fixed power setting for a first predetermined period of time, the first predetermined period of time being between 3 minutes and 8 minutes and the fixed power setting being between 70% and 90% of the engine's maximum power setting.

The selection of specific engine power setting and duration of operation is selected to be representative of the in-service conditions under which the engine is likely to operate and for which it is desired to ensure that a predetermined operational radial clearance between the rotor stage and the rotor casing can be maintained across the operational range of the engine, which in turn minimises a variation in rotor blade tip clearance from engine to engine.

Optionally, the N flow setting positions comprise a closed position, an open position, and between one and nine flow setting positions between the fully closed position and the fully open position.

The quantity of flow setting positions for the valve provides a representative range of values for the variation of rotor casing temperature across the operating range of the engine. This enables the method of the disclosure to determine a first characteristic being representative of the variation of the rotor casing temperature with valve position for the engine operation at the fixed power setting.

In a typical pass-off, or commissioning, situation, the method of the disclosure employs three valve positions; these being valve closed, valve approximately 20% open and valve fully open.

In another arrangement, the method of the disclosure may employ eleven valve positions; these being valve closed, valve fully open, and nine intermediate positions.

According to a second aspect of the present disclosure there is provided a case cooling calibration system for a gas turbine engine, the case cooling calibration system comprising:
a rotor casing;
a rotor stage, rotatably mounted within the rotor casing;
the rotor casing comprising in series fluid communication, a duct, a valve, and a manifold, the valve being operable to regulate an air flow through the duct to the manifold, the manifold arranged radially outwardly around the casing radially coplanar with the rotor stage,
a temperature sensing apparatus positioned on the rotor casing, radially outwardly of the rotor stage,
a controller operable to regulate the valve in a stepwise manner to provide a variable cooling air flow to the rotor casing,
a processor operable to calculate a correction characteristic in dependence on a comparison between the rotor casing temperature and a predicted rotor casing temperature for a given engine power condition, and
an engine controller operable to control the valve in dependence on the correction characteristic to maintain a predetermined operational radial clearance between the rotor stage and the rotor casing.

Conventional case cooling systems assume that all gas turbine engines of a given type will produce the same case cooling system flow for a given demanded flow. However, in practice there is a variation in case cooling system flow for any given flow demand.

Furthermore, an individual engine's variation in case cooling system flow with demanded flow can itself vary as the valve is opened from a minimum flow position to a maximum flow position.

The system of the disclosure enables the flow characteristic provided by the engine's case cooling system to be matched to the thermal characteristics of the whole engine. This enables a predetermined operational radial clearance to be maintained between the rotor stage and the rotor casing across the operational range of the engine, which in turn minimises a variation in rotor blade tip clearance from engine to engine.

Optionally, the valve has N flow setting positions.

Optionally, the rotor stage comprises a plurality of rotor blades arranged in a circumferential array, and the predetermined radial clearance is a predetermined radial clearance between radially outward tips of the rotor blades and a radially inwardly facing surface of the rotor casing.

During operation of the engine it is desirable to maintain the radial clearance between the rotor stage and the rotor casing at a minimum value in order to reduce flow losses therebetween.

In some specific engine operational points, it may be desirable to maintain a zero radial clearance between the rotor stage and the rotor casing. This may be termed 'tip rub'. Operation of the engine with tip rub may be desirable at points in the engine's operational range where maximum engine power is required.

Optionally, the temperature sensing apparatus is positioned on a radially outwardly facing surface of the rotor casing.

The temperature sensing apparatus is positioned at a location having a high sensitivity to the thermal effects of variation in case cooling flow rate.

This enables the system of the disclosure to provide an engine correction characteristic that provides for a predetermined operational radial clearance to be maintained between the rotor stage and the rotor casing across the operational range of the engine, which in turn minimises a variation in rotor blade tip clearance from engine to engine.

Optionally, the temperature sensing apparatus is positioned radially coplanar with the rotor stage.

By selecting the outwardly facing surface of the rotor casing to be radially coplanar with the rotor stage, the system of the disclosure can provide for maximum sensitivity to relative thermal growth of the rotor stage and the casing. This makes the system of the disclosure more effective at maintaining a predetermined operational radial clearance between the rotor stage and the rotor casing across the operational range of the engine, which in turn minimises a variation in rotor blade tip clearance from engine to engine.

Optionally, the temperature sensing apparatus comprises one or more thermocouples at each of two or more circumferential locations.

The use of thermocouples at each of two or more circumferential locations for sensing the temperature of the rotor casing makes the system of the disclosure more precise and hence more convenient for a user.

Optionally, the temperature sensing apparatus comprises two thermocouples at each of two or more circumferential locations.

In one arrangement, the two thermocouples are positioned at each of four circumferentially equally spaced locations on a radially outwardly facing surface of the rotor casing.

The use of two thermocouples at each of two or more circumferential locations enables an averaged temperature measurement to be made of the rotor casing temperature. This can provide a user with a more representative value of the temperature of the rotor casing.

The use of two thermocouples at each of two or more circumferential locations provides the system of the disclosure with a degree of redundancy in the event of the failure of one of the thermocouples.

Optionally, the N flow setting positions comprises a closed position, an open position, and between three and seven flow setting positions between the fully closed position and the fully open position.

The quantity of flow setting positions for the valve provides a representative range of values for the variation of rotor casing temperature across the operating range of the engine. This enables the system of the disclosure to determine a first characteristic being representative of the variation of the rotor casing temperature with valve position for the engine operation at the fixed power setting.

Optionally, the manifold is arranged radially outwardly around a radially outwardly facing surface of the casing radially of the rotor stage.

According to a third aspect of the present disclosure there is provided a gas turbine engine comprising a case cooling calibration system according to the second aspect of the disclosure.

According to a fourth aspect of the present disclosure there is provided a use of a gas turbine engine comprising a case cooling calibration system according to the second aspect of the disclosure.

In use, the ability to operate the gas turbine engine over its operational range whilst maintaining a predetermined clearance between the rotor stage and the rotor casing can prevent contact between the rotor stage and the rotor casing. This reduces the incidence of wear of the rotor casing and so increases the efficiency of the engine.

According to a fifth aspect of the present disclosure there is provided a computer program that, when read by a computer, causes execution of the method according to the first aspect of the disclosure.

The engine control unit comprises a microcontroller that controls the operation of the turbine case cooling valve to provide a cooling air flow sufficient to maintain the casing temperature at a value that enables the radial clearance between the rotor blades and the rotor casing to be controlled.

According to a sixth aspect of the present disclosure there is provided a computer readable medium comprising computer readable instructions that, when read by a computer, cause execution of the method as claimed in the first aspect of the disclosure.

According to a seventh aspect of the present disclosure there is provided a computer program comprising the computer readable medium as claimed the fourth aspect of the disclosure.

According to an eighth aspect of the present disclosure there is provided a signal comprising computer readable instructions that, when read by a computer, cause execution of the method as claimed in the first aspect of the disclosure.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
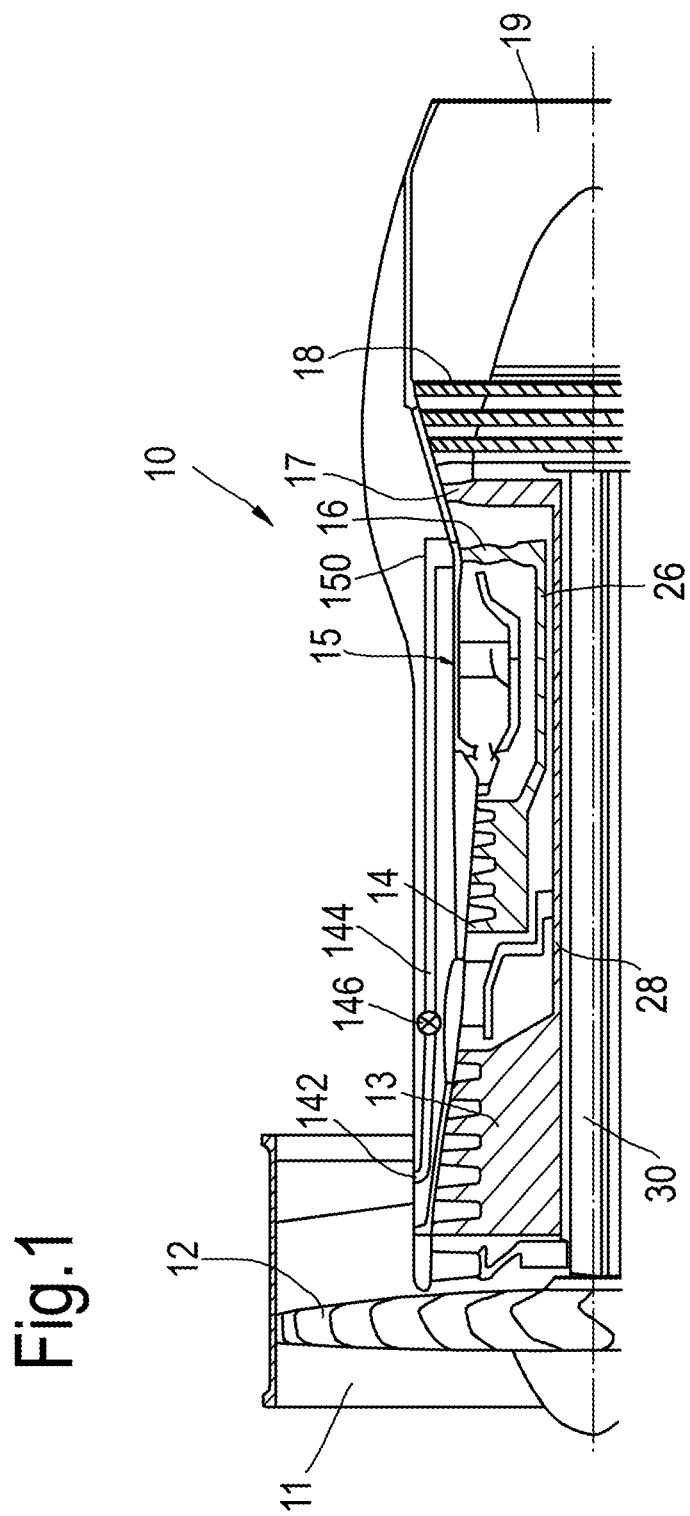
FIG. 1 shows a gas turbine engine incorporating a turbine case cooling system according to an embodiment of the disclosure.
Figure 2:
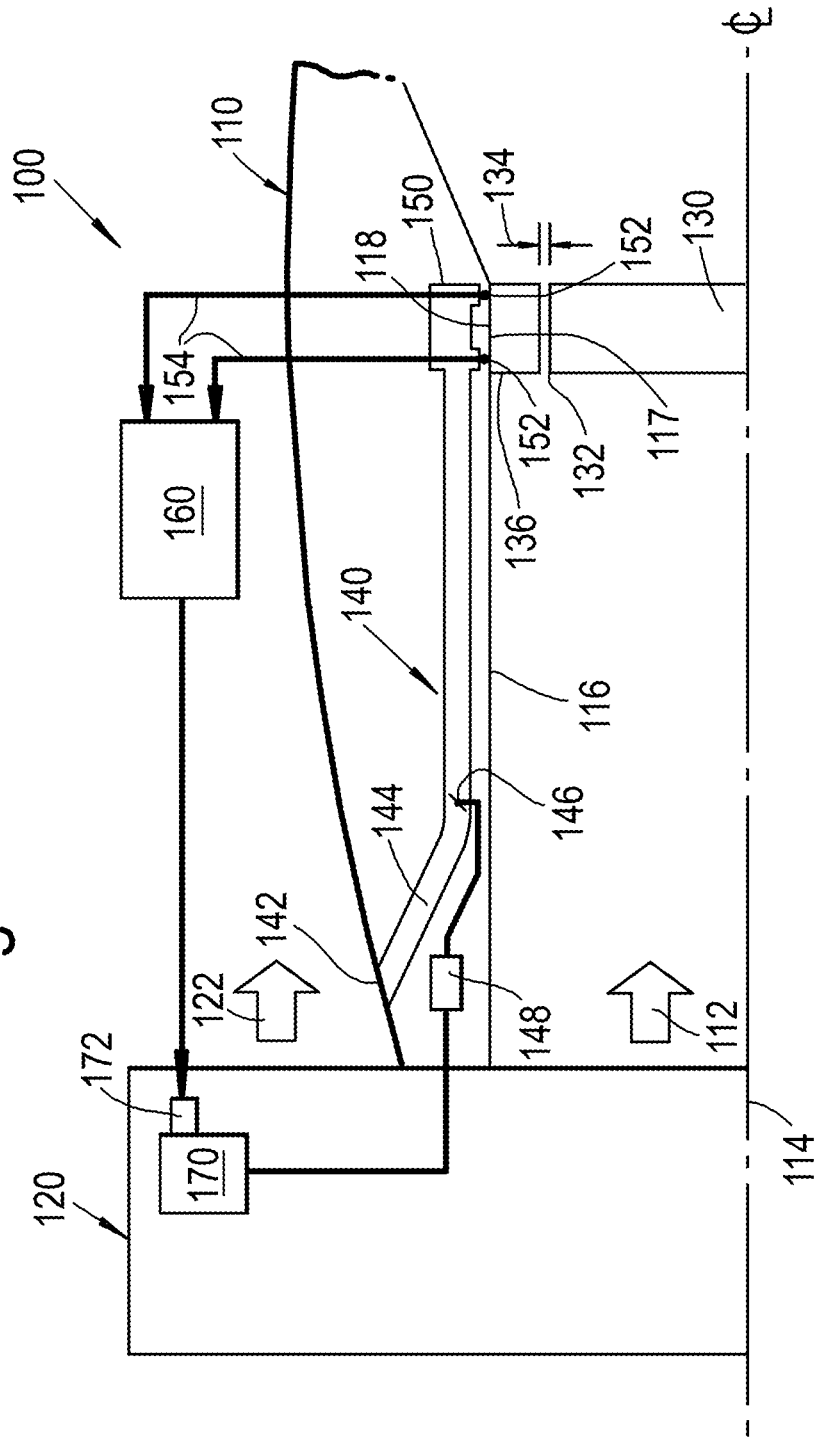
FIG. 2 shows a schematic sectional view of the turbine case cooling system of FIG. 1.

Referring to FIGS. 1 and 2, a turbine case cooling system for a gas turbine engine according to an embodiment of the disclosure is designated generally by the reference numeral 100.

The turbine case cooling system 100 of the disclosure is shown in relation to a turbofan gas turbine engine (specifically in FIG. 1). However, the system of the disclosure is equally applicable to other arrangements of gas turbine engine.

Furthermore, although the case cooling system of the disclosure is described in relation to a turbine stage of a gas turbine engine, the case cooling system of the disclosure may equally be applied to a compressor stage of a gas turbine engine.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

The case cooling system 100, shown in detail in FIG. 2, comprises a rotor casing 116, and a rotor stage 130 rotatably mounted within the rotor casing 116.

Figure 3:
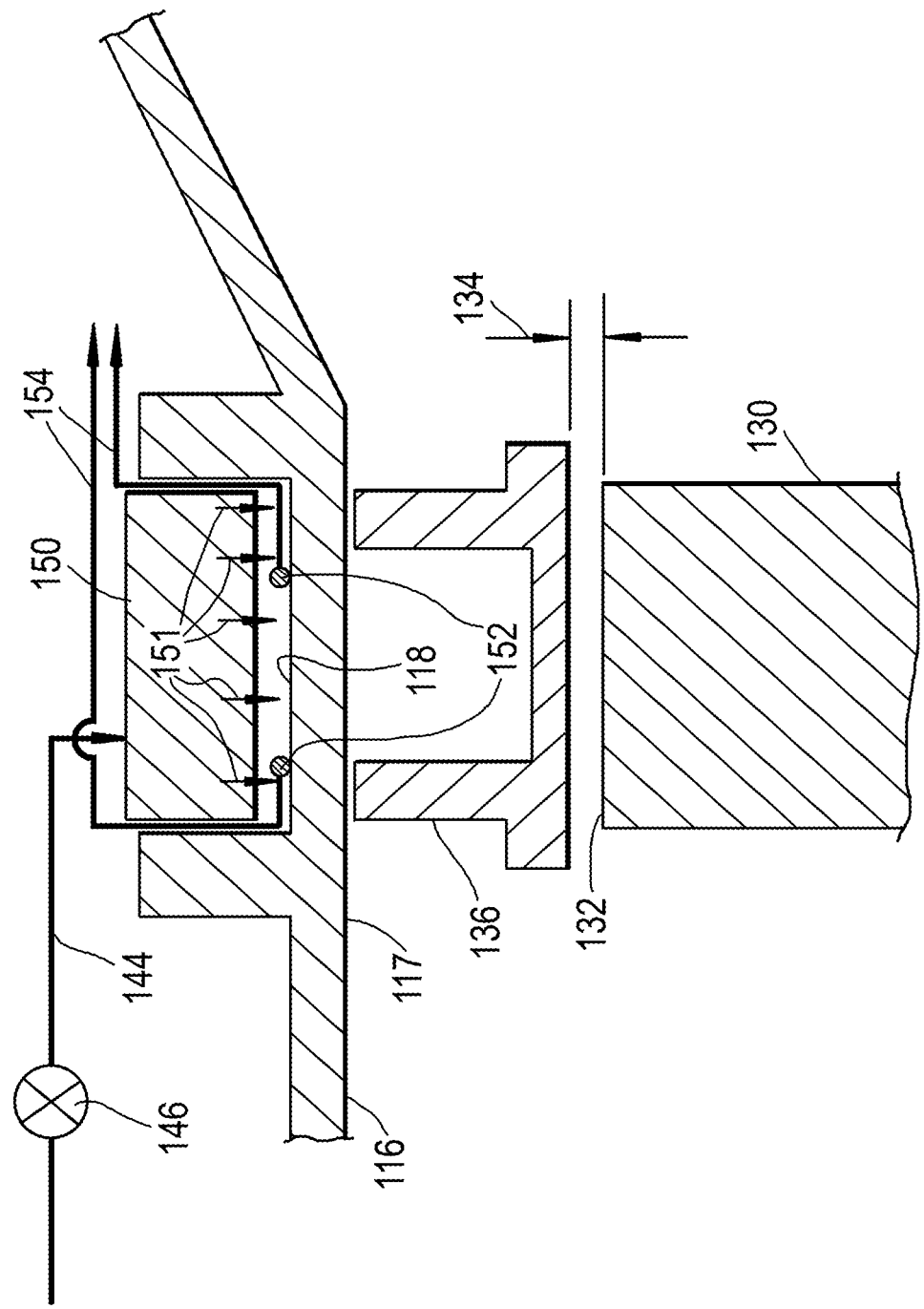
FIG. 3 shows a detailed schematic sectional view of the turbine casing of the system shown in FIG. 2.

FIG. 3 shows the rotor casing 116 and rotor stage 130 in more detail. The rotor casing 116 includes, on an inwardly facing surface 117, a segment 136. A rotor tip clearance 134 is defined between the rotor tip 132 and the segment 136.

The rotor tip clearance 134 is typically maintained at a predetermined value in order to ensure the efficient operation of the engine.

The rotor casing 116 comprises, in series fluid communication, a duct 144, a valve 146 and a manifold 150.

The duct 144 comprises an inlet 142 positioned on a radially outwardly facing surface of the core engine 110, into which air flows from the bypass flow around the core engine 110.

The valve 146 is operable to regulate the air flow through the duct 144. The valve 146 is actuated by an air valve actuator 148 that is controlled by an engine control unit 170. The valve 146 provides continuously variable control of the cooling air flow. In the present arrangement, the valve 146 is provided with four flow settings between the fully closed position and the fully open position.

In an alternative arrangement, the valve 146 is provided with three flow settings between the fully closed position and the fully open position.

In the present arrangement, the valve 146 is a butterfly valve 146 positioned within the duct 144. In other arrangements, the valve 146 may be an alternative flow controlling valve 146.

The manifold 150 is arranged radially around the rotor casing 116, radially coplanar with the rotor stage 130. In the present arrangement, the manifold 150 is formed as an annular housing around the rotor casing 130. The duct 144 provides an air flow into the manifold 150. The manifold 150 then directs an air flow 151 radially inwardly over the rotor casing 116 coplanar with the rotor stage 130.

A temperature sensing apparatus 152 is positioned on the rotor casing 116, radially outwardly of the rotor stage 130. In the present arrangement, the temperature sensing apparatus 152 comprises two thermocouples 152 at each of four circumferentially equally spaced locations around the rotor casing 116.

Each of the thermocouples 152 is attached to a radially outwardly facing surface 118 of the rotor casing 116. The thermocouples 152 are positioned axially on the rotor casing 116 to be coplanar with the rotor stage 130.

Signals from the thermocouples 152 are transmitted to a processor 160. In the system of the disclosure, the processor 160 is separate to the engine itself and is used only for the calibration of the case cooling system 100.

The processor 160 is connectably linked to the engine control unit 170 via a data entry plug 172.

The system 100 and the method of the disclosure are intended to be used before the engine is installed in a service application. In other words, typically the system 100 and the method of the invention would be employed whilst the engine is installed on a test bed.

However, if the thermocouples 152 are left in place when the engine is installed in a service application, the system and method of the disclosure may be further employed in service.

Figure 4:
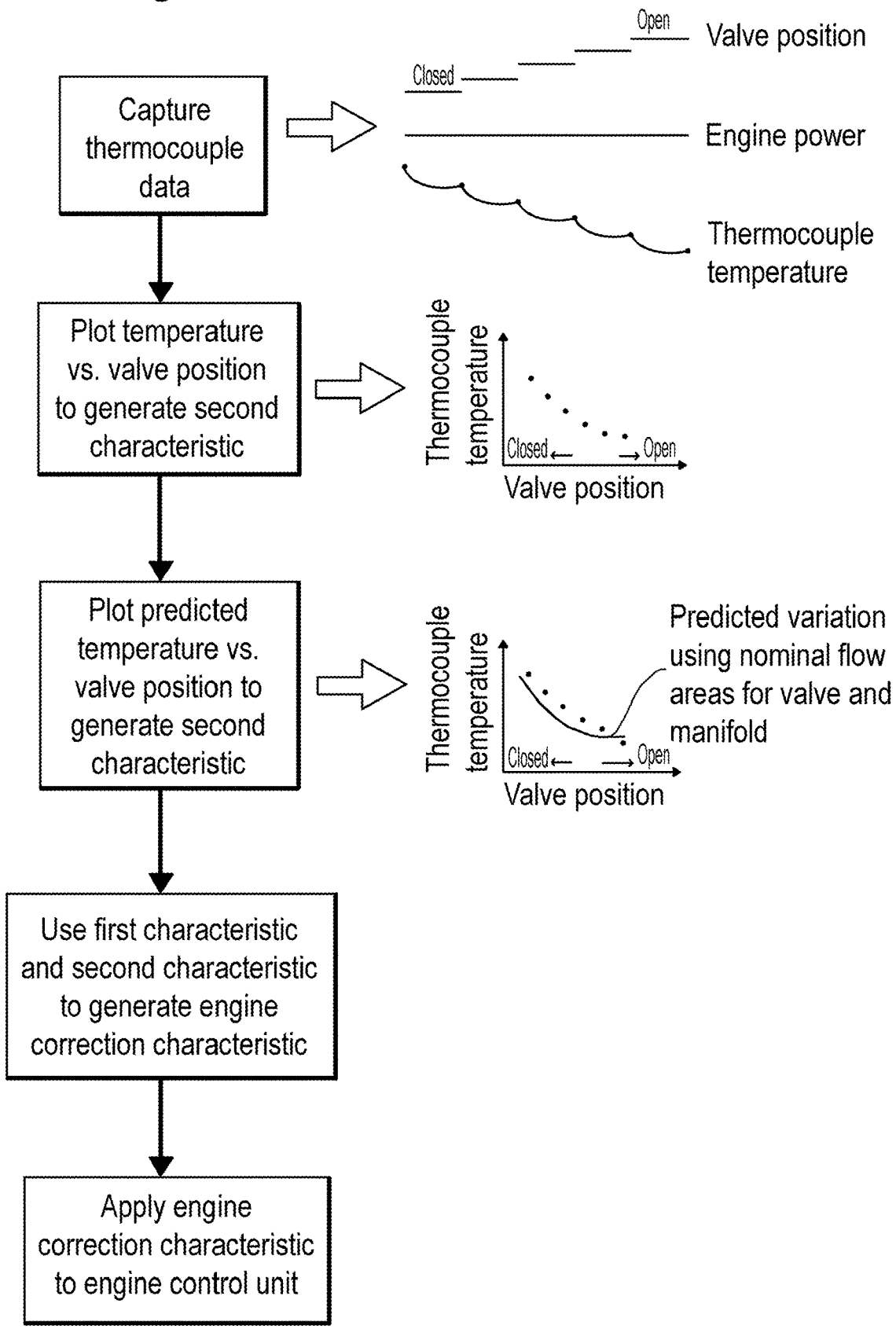
FIG. 4 shows a flow chart for the method of an embodiment of the disclosure.

FIG. 4 illustrates the sequence of steps comprising the method of the disclosure. This would typically be performed during the routine pass-off testing of the engine before it is released for service use.

As outlined above, the engine 110 would typically be installed on a test bed or test stand. The engine 110 would then be operated, again typically as part of the routine pass-off testing, according to the method of the disclosure.

The valve 146 is initially closed to prevent flow through the duct 144 and into the manifold 150. The engine 110 would then be operated at a fixed power setting for a first predetermined period of time. The first period of time is selected to bring the engine 110 to a thermal equilibrium.

Typically, the engine 110 would be operated at 80% of its maximum power for a period of approximately 6 minutes.

This ensures that at least the rotor stage 130 and the rotor casing 116 are in a thermal equilibrium.

The temperature of the rotor casing 116 is then measured using the thermocouples 152 with the output from the thermocouples 152 being transmitted to the processor 160.

The valve 146 is then moved from the closed position to the first position. The engine 110 is again operated at 80% of its maximum power for a further period of approximately 6 minutes to ensure the rotor stage 130 and the rotor casing 116 are in a thermal equilibrium.

A further sample of the temperature of the rotor casing 116 as measured by the thermocouples 152 is captured by the processor 160.

This process is repeated with the valve 146 being cycled through each of its positions from fully closed through to fully open. In the arrangement corresponding to FIG. 4, the valve 146 is provided with four positions between fully closed and fully open. For each valve position, the processor 160 captures a series of temperature measurements.

The processor 160 then generates a first characteristic being representative of the variation of the temperature of the rotor casing 116, with the valve position for operation of the engine 110 at the fixed power setting.

As part of the design phase of the engine's development, an aero-thermal model will have been developed to predict the temperature of the rotor casing for each of the valve positions during operation of the engine 110 at the fixed power setting.

This aero-thermal model can be used to generate a second characteristic being representative of the theoretical prediction of the variation of the temperature of the rotor casing 116, with the variation in manifold cooling flow for operation of the engine 110 at the fixed power setting.

Figure 5:
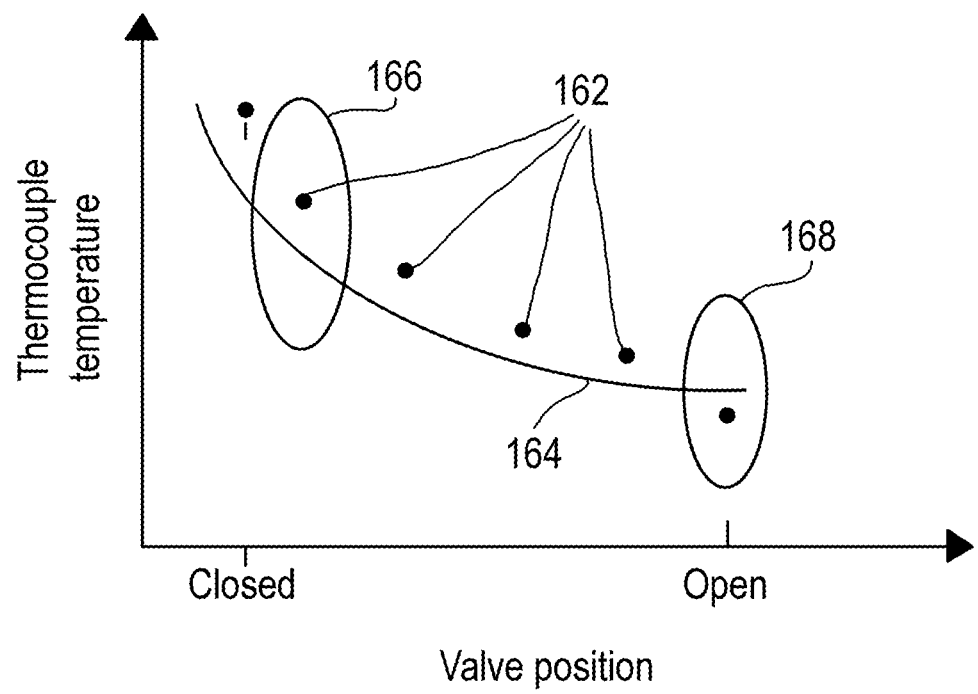
FIG. 5 shows a schematic variation of the thermocouple temperature with valve position for the system shown in FIG. 2.

FIG. 5 shows a variation in the temperature measured by the thermocouples with the valve position. The measured values of temperature are indicated by points 162. The theoretical prediction of the variation of the temperature of the rotor casing 116, with the variation in manifold cooling flow is indicated by the curve 164.

The behaviour of the system in region 166 is dominated by valve area, while the behaviour of the system in region 168 is dominated by the manifold jet area.

The processor 160 then generates for the individual engine an engine correction characteristic being derived from a difference between the first characteristic and the second characteristic.

This engine correction characteristic may then be applied to the predicted variation of the temperature of the rotor casing, with valve position, from the aero-thermal modelling to generate a control map for the actuation of the valve when the engine is in service.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

The invention claimed is:

1. A method of calibrating a case cooling system for a gas turbine engine, the engine comprising a rotor stage, the rotor stage being rotatably mounted within a rotor casing, the rotor casing comprising in series fluid communication, a duct, a flow control valve, and a manifold, the valve being operable to regulate an air flow through the duct to the manifold, the manifold arranged radially outwardly around the casing radially coplanar with the rotor stage, the method comprising the steps of:
(i) positioning a temperature sensing apparatus on the rotor casing, radially outwardly of the rotor stage;
(ii) closing the valve to prevent air flow through the duct;
(iii) operating the engine at a fixed power setting for a first predetermined period of time;
(iv) sensing a temperature of the rotor casing with the temperature sensing apparatus;
(v) opening the valve to a next flow setting position, the next flow setting position being a position that is more open than a previous flow setting position which is a flow setting position of the valve before completion of this step (v);
(vi) repeating steps (iii) to (v) until the valve is fully open;
(vii) generating a first characteristic being representative of the variation of the rotor casing temperature with valve position for the engine operation at the fixed power setting;
(viii) determining an engine correction characteristic from a difference between the first characteristic and a second characteristic, the second characteristic being a predetermined prediction of the variation of the rotor casing temperature with valve position for the engine; and
(ix) transmitting the engine correction characteristic to an engine control unit to calibrate the turbine case cooling system of the engine to enable a predetermined operational radial clearance to be maintained between the rotor stage and the rotor casing.

2. The method of claim 1, wherein the valve is operable to regulate an air flow through the duct to the manifold at N flow setting positions, and step (vi) comprises the step of:
(vi)' repeating steps (iii) to (v) N times.

3. The method of claim 1, wherein step (i) comprises the step of:
(i)' positioning a temperature sensing apparatus on a radially outwardly facing surface of the rotor casing, radially outwardly of, the rotor stage.

4. The method of claim 3, wherein the outwardly facing surface of the rotor casing is radially coplanar with the rotor stage.

5. The method as claimed in claim 1, wherein step (i) comprises the step of:
(i)' positioning one or more thermocouples at each of two or more circumferential locations on a radially outwardly facing surface of the rotor casing, radially outwardly of the rotor stage the temperature sensing apparatus.

6. The method as claimed in claim 1, wherein step (i) comprises the step of:
(i)' positioning two thermocouples at each of two or more circumferential locations on a radially outwardly facing surface of the rotor casing, radially outwardly of the rotor stage the temperature sensing apparatus.

7. The method as claimed in claim 1, wherein step (iii) comprises the step of:
(iii)' operating the engine at a fixed power setting for a first predetermined period of time, the first predetermined period of time being between 3 minutes and 8 minutes.

8. The method of claim 7, wherein step (iii)' comprises the step of:
(iii)" operating the engine at a fixed power setting for a first predetermined period of time, the first predetermined period of time being between 3 minutes and 8 minutes and the fixed power setting being between 70% and 90% of the engine's maximum power setting.

9. The method as claimed in claim 1, wherein the N flow setting positions comprise a closed position, an open position, and between one and nine flow setting positions between the fully closed position and the fully open position.

10. A non-transitory computer readable medium storing a computer program that, when executed by a computer, causes execution of the method as claimed in claim 1.

11. A non-transitory computer readable medium comprising computer readable instructions that, when executed by a computer, cause execution of the method as claimed in claim 1.

12. The method of claim 1, further comprising receiving a signal comprising computer readable instructions that, when executed by a computer, cause execution of the method as claimed in claim 1.

13. A case cooling calibration system for a gas turbine engine, the case cooling calibration system comprising:
   a rotor casing;
   a rotor stage, rotatably mounted within the rotor casing;
   the rotor casing comprising in series fluid communication,
      a duct, a valve, and a manifold, the valve being operable to regulate an air flow through the duct to the manifold, the manifold arranged radially outwardly around the casing radially coplanar with the rotor stage,
   a temperature sensing apparatus positioned on the rotor casing, radially outwardly of the rotor stage,
   a controller operable to regulate the valve in a stepwise manner to provide a variable cooling air flow to the rotor casing, the regulating of the valve including:
   (i) operating the engine at a fixed power setting for a first predetermined period of time;
   (ii) sensing a temperature of the rotor casing with the temperature sensing apparatus;
   (iii) opening the valve to a next flow setting position, the next flow setting position being a position that is more open than a previous flow setting position which is a flow setting position of the valve before completion of this step (iii);
   (iv) repeating steps (i) to (iv) until the valve is fully open;
   a processor operable to calculate a correction characteristic in dependence on a comparison between the rotor casing temperature and valve position for the engine operation at the fixed power setting, and
   an engine controller operable to control the valve in dependence on the correction characteristic to maintain a predetermined operational radial clearance between the rotor stage and the rotor casing.

14. The system as claimed in claim 13, wherein the valve has N flow setting positions.

15. The system as claimed in claim 13, wherein the rotor stage comprises a plurality of rotor blades arranged in a circumferential array, and the predetermined radial clearance is a predetermined radial clearance between radially outward tips of the rotor blades and a radially inwardly facing surface of the rotor casing.

16. The system as claimed in claim 13, wherein the temperature sensing apparatus is positioned on a radially outwardly facing surface of the rotor casing.

17. The system as claimed in claim 13, wherein the temperature sensing apparatus is positioned radially coplanar with the rotor stage.

18. The system as claimed in claim 13, wherein the temperature sensing apparatus comprises one or more thermocouples at each of two or more circumferential locations.

19. The system as claimed in claim 13, wherein the temperature sensing apparatus comprises two thermocouples at each of two or more circumferential locations.

20. The system as claimed in claim 13, wherein the N flow setting positions comprises a closed position, an open position, and between three and seven flow setting positions between the fully closed position and the fully open position.

21. The system as claimed in claim 13, wherein the manifold is arranged radially outwardly around a radially outwardly facing surface of the casing radially of the rotor stage.

22. A gas turbine engine comprising the case cooling calibration system as claimed in claim 13.

* * * * *